United States Patent
Hori et al.

(10) Patent No.: US 8,246,847 B2
(45) Date of Patent: Aug. 21, 2012

(54) SEPARATING METHOD FOR CONDUCTIVE CERAMICS SINTERED BODY

(75) Inventors: Masahiro Hori, Tokyo (JP); Kazuishi Mitani, Tokyo (JP); Yasuhiro Saito, Tokyo (JP); Nobuyuki Takatsuki, Tokyo (JP); Kyouichi Shukuri, Sagamihara (JP); Shunji Kuramoto, Sagamihara (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 818 days.

(21) Appl. No.: 11/991,871

(22) PCT Filed: Sep. 11, 2006

(86) PCT No.: PCT/JP2006/318439
§ 371 (c)(1),
(2), (4) Date: May 8, 2008

(87) PCT Pub. No.: WO2007/032503
PCT Pub. Date: Mar. 22, 2007

(65) Prior Publication Data
US 2010/0193465 A1    Aug. 5, 2010

(30) Foreign Application Priority Data
Sep. 12, 2005 (JP) ................... 2005-264369

(51) Int. Cl.
*C03C 15/00* (2006.01)
*C03C 25/68* (2006.01)

(52) U.S. Cl. ................. 216/83; 216/94; 216/95; 216/96; 216/97; 216/98; 216/99; 216/100

(58) Field of Classification Search ........................ None
See application file for complete search history.

(56) References Cited

U.S. PATENT DOCUMENTS
2010/0227752 A1    9/2010 Hori et al.

FOREIGN PATENT DOCUMENTS
JP          57123826 A  *  8/1982
(Continued)

OTHER PUBLICATIONS
Notification Concerning Transmittal of International Preliminary Report on Patentability, Chapter I of the Patent Cooperation Treaty, dated May 22, 2008, for PCT/JP2006/318439. 4 sheets.
(Continued)

*Primary Examiner* — Duy Deo
(74) *Attorney, Agent, or Firm* — Holtz, Holtz, Goodman & Chick, PC

(57) ABSTRACT

There are provided an aqueous solution for separation of a conductive ceramics sintered body in which a conductive ceramic sintered body separated form a glass can be collected in a recyclable condition, and a separating method therefor, and an aqueous solution for separation with which a dark ceramics sintered body, a conductive ceramics sintered body and a glass are separately collected from a glass with a dark ceramics sintered body in which a conductive ceramics sintered body is formed on the dark ceramics sintered body, and a separating method therefor. A treatment liquid having an etching ability for at least one of a glass and a conductive ceramic sintered body is prepared as an aqueous solution 20 for separation of the conductive ceramics sintered body, then the aqueous solution 20 for separation is filled in a container 11, and a glass with a conductive ceramics sintered body 30 is immersed into the aqueous solution 20 for separation in the container 11.

3 Claims, 2 Drawing Sheets

FOREIGN PATENT DOCUMENTS

| | | |
|---|---|---|
| JP | 2001-106553 A | 4/2001 |
| JP | 2003-063842 A | 3/2003 |
| JP | 2003-073144 A | 3/2003 |
| JP | 2003-080461 A | 3/2003 |
| JP | 2005-108468 A | 4/2005 |

OTHER PUBLICATIONS

U.S. Appl. No. 11/991,870, filed May 8, 2008; First Named Inventor: Masahiro Hori; Title: "Separating Method for Dark Ceramics Sintered Body".

* cited by examiner

US 8,246,847 B2

SEPARATING METHOD FOR CONDUCTIVE CERAMICS SINTERED BODY

This application is a U.S. National Phase Application under 35 USC 371 of International Application PCT/JP2006/318439 filed Sep. 11, 2006.

TECHNICAL FIELD

The present invention relates to a separating method for a conductive ceramics sintered body, and particularly to a separating method for a conductive ceramics sintered body, which is useful to recycle a conductive ceramics sintered body separated from a glass.

BACKGROUND ART

As shown in FIG. 2, various substances different in nature from a glass plate are attached to the glass plate for an automobile rear glass. In the automobile rear glass 50 in FIG. 2, a glass plate 52 is attached with substances different in nature from a glass plate such as an adhesive agent for fixing the glass plate 52 to an automobile body, a dark ceramics sintered body 53 for concealing this adhesive agent from the outside of the automobile, and a conductive ceramics sintered body 51 for removing mist from the glass plate 52 or imparting an antenna function to the glass plate 52.

In order to collect this glass plate 52 in a recyclable condition, as a method of removing the conductive ceramics sintered body 51 from the glass plate 52, a method in which a fluid containing fine particles is blown out from a nozzle to the conductive ceramics sintered body 51 to make the fluid containing fine particles collide with the conductive ceramics sintered body 51, and the conductive ceramics sintered body 51 is scraped away from the glass plate 52 has been known (see, for example, Japanese Patent Application Laid-Open No. 2003-80461).

In the above described method, however, since the conductive ceramics sintered body 51 is scraped away from the glass plate 52 by making the fluid containing fine particles collide with the conductive ceramics sintered body 51, fragments of the glass plate 52 contaminate the conductive ceramics sintered body 51 that is scraped away. Therefore, the glass plate 52 can be collected in a recyclable condition, but a conductive material (for example, silver) constituting the conductive ceramics sintered body 51 cannot be collected in a recyclable condition.

An object of the present invention is to provide a separating method for a conductive ceramics sintered body, wherein the conductive ceramics sintered body separated from glass can be collected in a recyclable condition, and a separating method, wherein a dark ceramics sintered body, a conductive ceramics sintered body and a glass can be separately collected from the glass attached with the dark ceramics sintered body on which the conductive ceramics sintered body is formed.

DISCLOSURE OF THE INVENTION

In order to achieve the above described object, according to a first aspect of the present invention, there is provided an aqueous solution for separation of a conductive ceramics sintered body, which separates the conductive ceramics sintered body from a glass, wherein the aqueous solution has an etching ability for at least one of the glass and the conductive ceramics sintered body.

In the first aspect, it is preferred that the aqueous solution for separation is an acidic aqueous solution.

In the first aspect, it is preferred that the acidic aqueous solution comprises a strong acid.

In the first aspect, it is preferred that the strong acid is hydrochloric acid.

In the first aspect, it is preferred that a concentration of hydrochloric acid in the acidic aqueous solution is 0.27 mol/L (1.0 wt %) or more.

In the first aspect, it is preferred that the acidic aqueous solution comprises fluorine ion.

In the first aspect, it is preferred that the acidic aqueous solution comprises $HF_2^-$ as the fluorine ion.

In the first aspect, it is preferred that the concentration of the $HF_2^-$ is 0.005 mol/L or more.

In the first aspect, it is preferred that the aqueous solution for separation comprises a complex forming component.

In the first aspect, it is preferred that the complex forming component comprises one or two or more selected from the group consisting of aminocarboxylic acids such as ethylenediaminetetraacetic acid (EDTA), nitrilotriacetic acid (NTA) and diethylenetriaminepentaacetic acid (DTPA), and salts thereof, oxycarboxylic acids such as oxalic acid, tartaric acid, malic acid, citric acid, malonic acid, succinic acid and gluconic acid, and salts thereof, and phosphoric acids such as phosphoric acid, hydroxyethane diphosphoric acid (HEDP) and tripolyphosphoric acid (TPP), and salts thereof.

In the first aspect, it is preferred that the acidic aqueous solution comprises a surfactant.

In order to achieve the above described object, according to an aspect of the present invention, there is provided an immersion step of immersing a glass with a conductive ceramics sintered body in an aqueous solution for separation having an etching ability for at least one of the glass and the conductive ceramics sintered body.

In the aspect of the present invention, it is preferred that the immersion step comprises a first immersion step of immersing a glass with a conductive ceramics sintered body that is attached on a dark ceramics sintered body in an acidic aqueous solution containing hydrochloric acid and separating the glass with a dark ceramics sintered body from the conductive ceramics sintered body, and a second immersion step of immersing the glass attached with the dark ceramics sintered body, which is separated in said first immersion step, in an acidic aqueous solution containing a fluorine ion and separating the dark ceramics sintered body from the glass.

In the second aspect, it is preferred that the first aqueous solution for separation is an acidic aqueous solution comprising hydrochloric acid, and the second aqueous solution for separation is an acidic aqueous solution comprising fluorine ion.

BEST MODE FOR CARRYING OUT THE INVENTION

Figure 1:
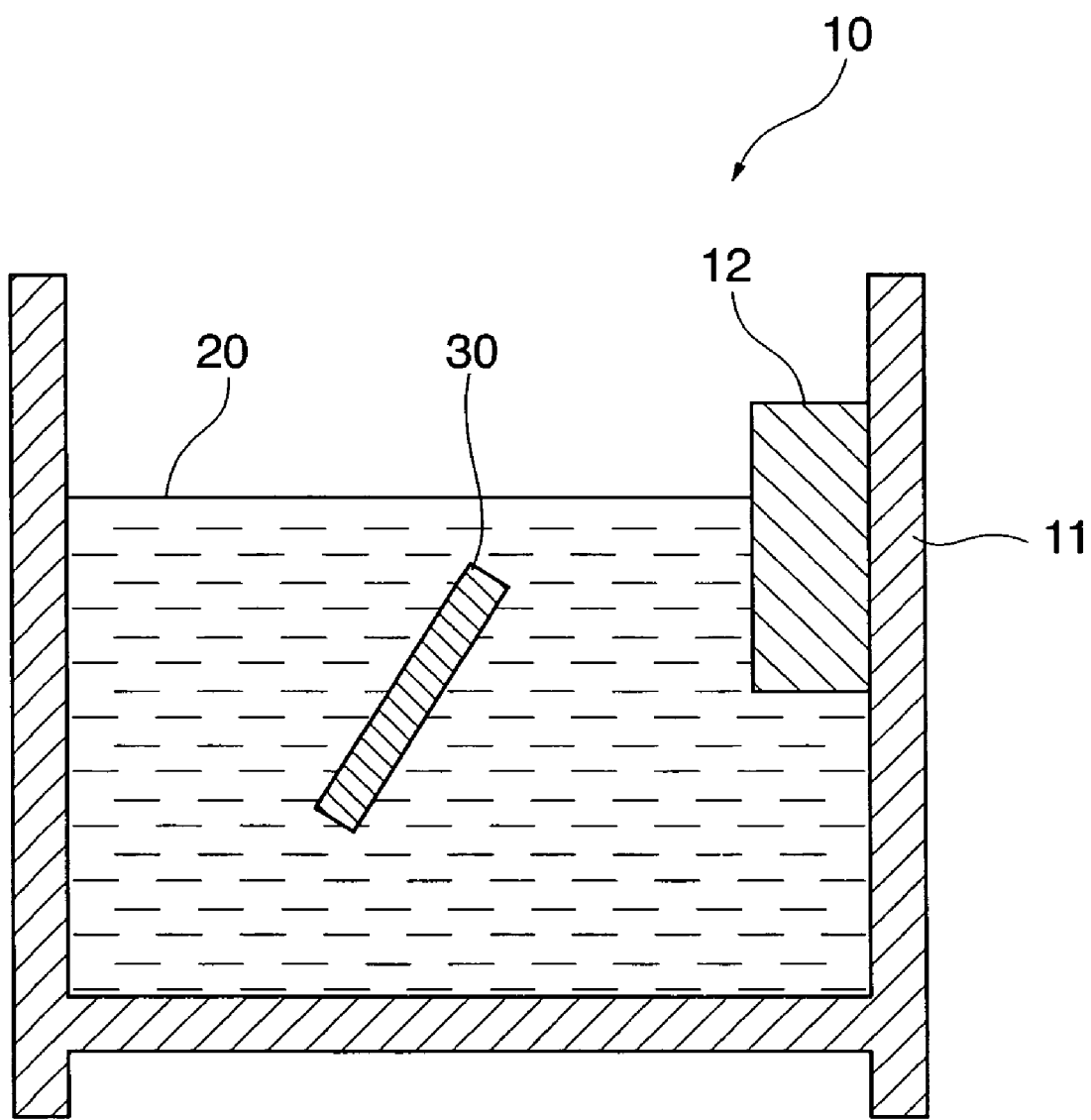
FIG. 1 is a cross-sectional view schematically showing a structure of a liquid bath used for immersing a glass into the aqueous solution for separation of a conductive ceramics sintered body according to an embodiment of the present invention.
Figure 2:
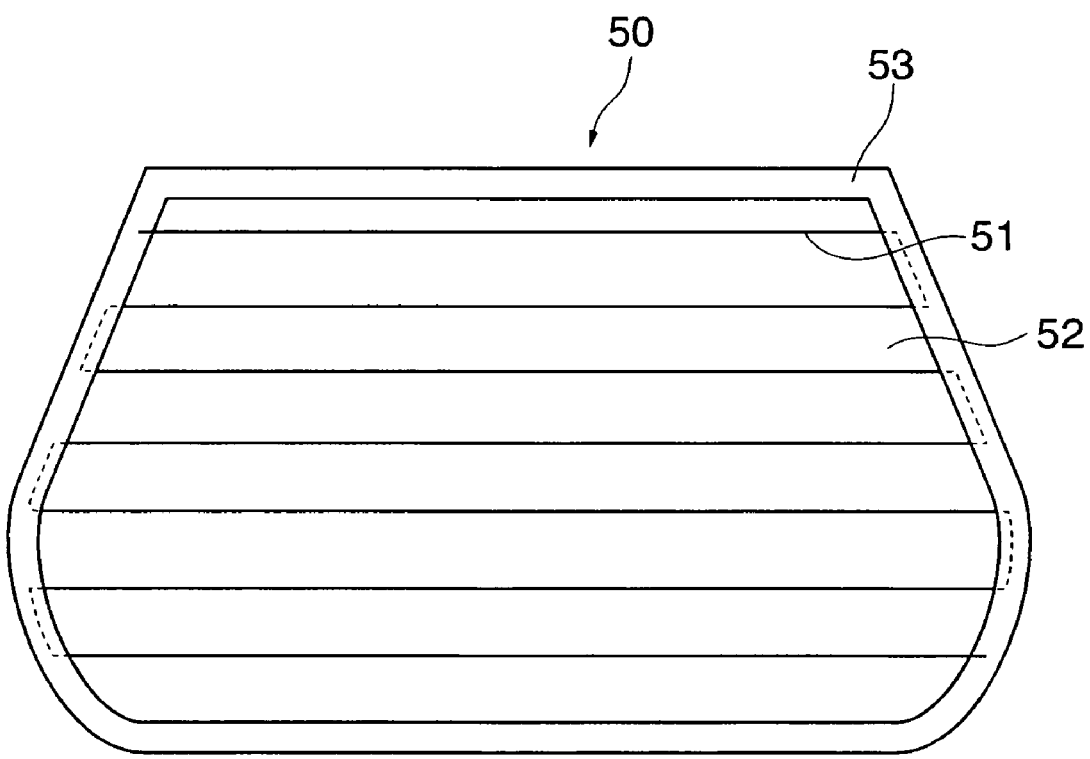
FIG. 2 is a view schematically showing a structure of a conventional automobile rear glass.

The inventors of the present invention made intensive studies in order to attain the above described objects, and as a result discovered that if an aqueous solution for separation of a conductive ceramics sintered body, which separates a conductive ceramics sintered body from a glass, has etching ability for at least one of the glass and the conductive ceramics sintered body, the conductive ceramics sintered body that is separated from the glass can be collected in a recyclable condition. It is also found that in a glass with a conductive ceramics sintered body in which the conductive ceramics sintered body is formed on a dark ceramics sintered body, the dark ceramics sintered body, the conductive ceramics sintered body and the glass can be respectively separately collected from the glass with a conductive ceramic sintered body.

The present invention was accomplished based on the results of the above described studies.

Hereinafter, an aqueous solution for separation of a conductive ceramics sintered body and a separating method therefor according to embodiments of the present invention will be described.

As an aqueous solution for separation of a conductive ceramics sintered body according to an embodiment of the present invention, hydrochloric acid (hereinafter referred to as "type A treatment liquid") was prepared. In addition, an acidic aqueous solution for separation is not limited to hydrochloric acid, but strong acids such as nitric acid and sulfuric acid or weak acids such as sulfamic acid, phosphoric acid, acetic acid, formic acid and carbonic acid may be used.

Further, as an aqueous solution for separation of a conductive ceramics sintered body according to an embodiment of the present invention, hydrofluoric acid (hereinafter referred to as a "type B treatment liquid") and a mixture of ammonium fluoride and an acid (hereinafter referred to as "type C treatment liquid") were prepared. In addition, an aqueous solution for separation containing fluorine ion is not limited to these, but a mixture of ammonium sulfate and hydrofluoric acid, a mixture of hydrofluoric acid and an acid, hexafluorosilicic acid, or the like may be used. All of these aqueous solutions for separation contain $HF_2^-$ that is an ion species of cutting a siloxane bond. In a mixture of hydrofluoric acid and an acid, an acid to be mixed in, such as sulfamic acid, phosphoric acid, nitric acid, sulfuric acid, acetic acid, formic acid, hydrochloric acid and carbonic acid can be used.

First, the type A treatment liquid was prepared by diluting concentrated hydrochloric acid having a concentration of 8.2 mol/L (30 wt %) with purified water.

Since the type A treatment liquid contains hydrochloric acid, a metallic component contained in a conductive ceramics sintered body is dissolved, the type A treatment liquid can etch the conductive ceramics sintered body, and thereby allowing to easily penetrate into an interface between a glass and the conductive ceramics sintered body. As a result, the glass and the conductive ceramics sintered body can be collected in a recyclable condition.

Since the type A treatment liquid contains hydrochloric acid, chlorine ion dissolves a metallic component (for example, silver) contained in a conductive ceramics sintered body and easily penetrates into an interface between the glass and the conductive ceramics from a surface of the conductive ceramics sintered body, and thus etching ability for the conductive ceramics sintered body can be further improved, thereby selectively etching only the conductive ceramics sintered body in a glass with a conductive ceramics sintered body that is attached on a dark ceramics sintered body, and thus the type A treatment liquid can be easily penetrate into the interface between the glass and the conductive ceramics sintered body. As a result, without separating a dark ceramics sintered body, only a conductive ceramics sintered body can be selectively separated from the glass. If a concentration of hydrochloric acid is a predetermined concentration or higher, equivalent etching ability can be obtained. For example, when a concentration of hydrochloric acid is 1.35 mol/L (5 wt %), etching ability (ability to dissolve a metallic component) for a conductive ceramics sintered body is equivalent to a case where a concentration of hydrochloric acid is 0.27 mol/L (1 wt %). In addition, since a dissolution amount of a metallic component (for example, silver) in a conductive ceramics sintered body increases when the concentration of hydrochloric acid is excessively higher, a lower concentration of hydrochloric acid is advantageous for recycling the conductive ceramics sintered body.

In the type B treatment liquid, when a concentration of ion species of cutting a siloxane bond, that is $HF_2^-$, is less than 0.005 mol/L (HF concentration of 0.05 mol/L (0.10 wt %)), the $HF_2^-$ concentration decreases during a treatment for separating a conductive ceramics sintered body from a glass, and decrease in an etching rate for the glass and/or the conductive ceramics sintered body is significant. Therefore, in order to separate in a short time, it is preferred that a $HF_2^-$ concentration is not less than 0.005 mol/L (HF concentration of 0.05 mol/L (0.10 wt %)). However, if the $HF_2^-$ concentration is excessively high, a large amount of precipitate of fluoride is generated as an etching residue, which causes a problem on operation.

Herein, main chemical species present in the type B treatment liquid are HF, $H^+$, $F^-$ and $HF_2^-$ and expressed by the following equilibrium formulas (1) and (2):

$$[HF] \leftrightarrows [H^+]+[F^-] \tag{1}$$

$$[HF_2^-] \leftrightarrows [HF]+[F^-] \tag{2}$$

Equilibrium constants in the equilibrium formulas (1) and (2) are respectively expressed by $K_1$ and $K_2$. $K_1$ and $K_2$ are estimated by various techniques, typically by an electrochemical technique. A $[HF_2^-]$ concentration can be calculated from values of $K_1$ and $K_2$, and a hydrogen ion concentration $[H^+]$ and a hydrofluoric acid concentration $[HF]$ in hydrofluoric acid.

When a strong acid such as sulfuric acid as a proton source is added to hydrofluoric acid (type B treatment liquid), a concentration of $HF_2^-$ that is ion species of cutting a siloxane bond can be increased, thus being more preferable.

According to the above description, when a treatment liquid is hydrofluoric acid (type B treatment liquid) or a solution obtained by adding a strong acid to hydrofluoric acid (type B treatment liquid), the treatment liquid can easily penetrate into an interface between a glass and a conductive ceramics sintered body, and thus the glass and the conductive ceramics sintered body can be separated.

In a mixture of ammonium fluoride and an acid (type C treatment liquid), similar to hydrofluoric acid (type B treatment liquid), it is preferred that a $HF_2^-$ concentration is not less than 0.005 mol/L (a HF concentration of 0.05 mol/L (0.10 wt %)).

Herein, chemical species mainly present in the type C treatment liquid are $NH_4F$, HF, $H^+$, $F^-$, $HF_2^-$ and $NH_4^+$, and are expressed by the following equilibrium formulas (4) to (6):

$$[HF] \leftrightarrows [H^+]+[F^-] \tag{4}$$

$$[HF_2^-] \leftrightarrows [HF]+[F^-] \tag{5}$$

$$[NH_4F] \leftrightarrows [NH_4^+]+[F^-] \tag{6}$$

Equilibrium constants in the equilibrium formulas (4) to (6) are respectively expressed by $K_1$, $K_2$ and $K_3$. $K_1$, $K_2$ and $K_3$ are estimated by various techniques, typically by an electrochemical technique. A $[HF_2^-]$ concentration can be calculated from values of $K_1$, $K_2$ and $K_3$, and a hydrogen ion concentration [H$^+$] and an ammonium fluoride concentration [NH$_4$F].

Further, the conductive ceramics sintered body is deposited on a bottom surface of the glass in many cases, and an etching rate is necessary to be improved. In order to improve the etching rate, a complex forming component may be added to the type A to C treatment liquids. As the complex forming component, the following can be suitably combined to be used: aminocarboxylic acids such as ethylenediaminetetraacetic acid (EDTA), nitrilotriacetic acid (NTA) and diethylenetriaminepentaacetic acid (DTPA), and salts thereof, oxycarboxylic acids such as oxalic acid, tartaric acid, malic acid, citric acid, malonic acid, succinic acid and gluconic acid, and salts thereof, and phosphoric acids such as phosphoric acid, hydroxyethane diphosphoric acid (HEDP) and tripolyphosphoric acid (TPP), and salts thereof. For the complex forming component, oxalic acid, tartaric acid, malic acid, citric acid, malonic acid, succinic acid and gluconic acid, phosphoric acid, hydroxyethane diphosphoric acid (HEDP) and tripolyphosphoric acid (TPP), and salts thereof are more preferable from the viewpoint of stability in an acidic aqueous solution.

According to an embodiment of the present invention, since the etching ability is exhibited for at least one of a glass or a conductive ceramics sintered body, an aqueous solution for separation can easily penetrates into an interface between the glass and the conductive ceramics sintered body, and thus the conductive ceramics sintered body separated from the glass can be collected in a recyclable condition.

The glass on which a conductive ceramics sintered body is formed in the present invention, includes a glass on which a conductive ceramics sintered body is formed such as a glass for an automobile window, a glass for a building window, a glass for a plasma display, and the like. The automobile window means respective parts of windows such as a front window, a rear window, a side window, etc. By the way, a front window is generally formed from a laminated glass, and other parts of the glasses are formed from a reinforced glass. The laminated glass is formed by laminating a plurality of glasses via intermediate films. Therefore, in order to collect and regenerate a front window glass, intermediate films and glasses are separated in addition to the separating method of the present invention. In any way, according to the present invention, a conductive ceramics sintered body can be separated from a glass on which the conductive ceramics sintered body is formed.

As the conductive ceramics sintered body separated from a glass, it can be exemplified a conductive ceramics sintered body imparting an antenna function and an anti-misting function to the glass. As a composition of a conductive ceramics sintered body, for example, it can be exemplified silver, as a main component, and the other such as bismuth, bismuth oxide, zinc, zinc oxide, boric acid.

EXAMPLE 1

In Example 1, a glass with a conductive ceramics sintered body was immersed into hydrochloric acid (type A treatment liquid) having a temperature increased to 40° C., hydrofluoric acid (type B treatment liquid) and, a mixture of ammonium fluoride and an acid (type C treatment liquid).

As the above described type A treatment liquid, 6 types of treatment liquids (samples A1 to A6) were prepared so that the hydrochloric acid concentrations were 0.03 to 1.35 mol/L (0.1 to 5.0 wt %). The compositions of the samples A1 to A6 are shown in Table 1.

As the above described type B treatment liquid, 6 types of treatment liquids (samples B1 to B6) were prepared so that the HF concentrations were 0.05 to 0.5 mol/L (0.1 to 1.0 wt %). The HF$_2^-$ concentrations of samples B1 to B6 ware estimated to be 0.005 to 0.05 mol/L. The compositions of the samples B1 to B6 are shown in Table 2.

As the above type C treatment liquid, 2 types of samples (samples C1 and C2) were prepared so that the treatment liquids were mixed solutions of ammonium fluoride, sulfamic acid and phosphoric acid, and the HF$_2^-$ concentrations were 0.01 mol/L and 0.014 mol/L. The compositions of the samples C1 and C2 are shown in Table 3

FIG. 1 is a cross-sectional view schematically showing a structure of a liquid bath used for immersing a glass into an aqueous solution for separation of a conductive ceramics sintered body according to an embodiment of the present invention.

In FIG. 1, the liquid bath 10 is provided with a container 11 for storing the types A to C treatment liquids as an aqueous solution 20 for separation of a conductive ceramics sintered body and a temperature adjusting device 12 for adjusting a temperature of the aqueous solution 20 for separation. The container 11 was filled with the aqueous solution 20 for separation, the temperature of the aqueous solution 20 for separation in the container 11 was adjusted to 40° C., and a glass with a conductive ceramics sintered body 30 was immersed into the aqueous solution 20 for separation in the container 11.

For the glass with a conductive ceramics sintered body 30 immersed into the aqueous solution 20 for separation, a time until separating the conductive ceramics sintered body from the glass (separating time) was measured. The compositions of treatment liquids (types A to C treatment liquids) as the above described aqueous solution for separations, temperatures thereof, and measured separating times are shown in Tables 1 to 3.

TABLE 1

| Type A treatment liquid | | Sample A1 | Sample A2 | Sample A3 | Sample A4 | Sample A5 | Sample A6 |
| --- | --- | --- | --- | --- | --- | --- | --- |
| Hydrochloric acid concentration | mol/L | 0.03 | 0.14 | 0.19 | 0.24 | 0.27 | 1.35 |
|  | wt % | 0.1 | 0.5 | 0.7 | 0.9 | 1.0 | 5.0 |
| Temperature of treatment liquid | ° C. | 40 | 40 | 40 | 40 | 40 | 40 |
| Separating time of conductive ceramics sintered body | Second | 1800 | 900 | 420 | 240 | 60 | 60 |

TABLE 2

| Type B treatment liquid | | Sample B1 | Sample B2 | Sample B3 | Sample B4 | Sample B5 | Sample B6 |
|---|---|---|---|---|---|---|---|
| HF concentration (hydrofluoric acid concentration) | mol/L | 0.050 | 0.25 | 0.50 | 0.05 | 0.05 | 0.10 |
| | wt % | 0.10 | 0.50 | 1.0 | 0.1 | 0.1 | 0.2 |
| $HF_2^-$ concentration | mol/L | 0.005 | 0.025 | 0.050 | 0.005 | 0.005 | 0.010 |
| Tartaric acid concentration | mol/L | 0 | 0 | 0 | 0.0067 | 0 | 0 |
| | wt % | 0 | 0 | 0 | 0.1 | 0 | 0 |
| Surfactant concentration | wt % | 0 | 0 | 0 | 0 | 0.50 | 0 |
| Temperature of treatment liquid | °C. | 40 | 40 | 40 | 40 | 40 | 40 |
| Separating time of conductive ceramics sintered body | Second | 987 | 267 | 130 | 267 | 223 | 440 |

TABLE 3

| Type C treatment liquid | | Sample C1 | Sample C2 |
|---|---|---|---|
| $NH_4F$ concentration (ammonium fluoride concentration) | mol/L | 0.10 | 0.14 |
| | wt % | 0.35 | 0.53 |
| $HF_2^-$ concentration | mol/L | 0.01 | 0.014 |
| Sulfamic acid concentration | mol/L | 0.10 | 0.15 |
| | wt % | 1.0 | 1.5 |
| Phosphoric acid concentration | mol/L | 0.10 | 0.15 |
| | wt % | 1.0 | 1.5 |
| Temperature of treatment liquid | °C. | 40 | 40 |
| Separating time of conductive ceramics sintered body | Second | 310 | 210 |

According to Tables 1 to 3, it was found that, by immersing the glass with a conductive ceramic sintered body 30 into the aqueous solution 20 for separation made of type A to C treatment liquids, the glass was separated from the conductive ceramic sintered body, and the conductive ceramic sintered body separated from the glass can be collected in a recyclable condition.

As for the type A treatment liquid, the higher the hydrochloric acid concentration was, the shorter the separating time was, and when immersed into samples A5 and A6, separating times were shortest as compared with a case of immersing into the type B or C treatment liquid. Further, among the type A treatment liquids, when the hydrochloric acid concentration was 0.27 mol/L (1 wt %) (immersion into sample A5), the separating time was equivalent to the case where a hydrochloric acid concentration was 1.35 mol/L (5 wt %) (immersion into sample A6).

In the type B treatment liquid, when the HF concentration was adjusted to 0.25 mol/L (0.5 wt %) and the $HF_2^-$ concentration was adjusted to 0.025 mol/L (immersion into sample B2), the separation time was shorter as compared with the case where the HF concentration was adjusted to 0.05 mol/L (0.1 wt %) and the $HF_2^-$ concentration was adjusted to 0.005 mol/L (immersion into sample B1). Furthermore, even when the HF concentration was changed to 0.5 mol/L (1 wt %) and the $HF_2^-$ concentration was changed to 0.05 mol/L (immersion into sample B3), the separating time was not significantly changed.

When using a treatment liquid obtained by adding 0.0067 mol/L (0.1 wt %) of tartaric acid as a complex forming component to the sample B1 as a type B treatment liquid (immersion into sample B4), the etching rate was higher and the separating time was shorter, as compared with the case of not adding tartaric acid that is a complex forming component (immersion into sample B1).

When using a treatment liquid obtained by adding 0.5 wt % of a surfactant to the sample B1 as a type B treatment liquid (immersion into sample B5), by easily penetrating hydrofluoric acid into an interface between a glass and a conductive ceramics sintered body from the surface of a conductive ceramics sintered body, the separating time was shorter, as compared with the case of not adding a surfactant (immersion into sample B1).

The sample C1 as a type C treatment liquid contains 0.1 mol/L (0.35 wt %) of ammonium fluoride, and a $HF_2^-$ concentration is 0.01 mol/L. If comparing immersion into sample B6 with an equivalent $HF_2^-$ concentration with immersion into sample C1, the separating time of immersion into sample C1 is shorter. This is because an etching rate is increased by adding phosphoric acid as a complex forming component.

EXAMPLE 2

In Example 2, the above described samples A5, B6 and C1 were prepared in the same manner as Example 1, and temperatures were increased to 45° C., and a glass with a conductive ceramics sintered body that is attached on a dark ceramics sintered body was immersed into the samples.

For the glass with a conductive ceramics sintered body that is attached on a dark ceramics sintered body immersed into the samples A5, B6 and C1, a time until separating the conductive ceramics sintered body from the dark ceramics sintered body and a time until separating the dark ceramics sintered body from the glass were measured respectively. Results are shown in Table 4.

TABLE 4

| | Separating time of conductive ceramics sintered body |
|---|---|
| Sample A5 | 1 minute |
| Sample B6 | 20 minutes* |
| Sample C1 | 15 minutes* |

*If immersed for 25 minutes, a dark ceramics sintered body is also separated.

It was found that by immersing the glass with a conductive ceramics sintered body that is attached on a dark ceramics sintered body in the sample A5, only the conductive ceramics sintered body can be selectively separated from the dark ceramics sintered body without separating the dark ceramics sintered body from the glass, and the conductive ceramics sintered body separated from the dark ceramics sintered body can be collected in a recyclable condition.

The conductive ceramics sintered body was separated from the dark ceramics sintered body after 20 minutes of immersion into the sample B6 and 15 minutes of immersion into the sample C1, but the dark ceramics sintered body was also separated from the glass after 25 minutes.

EXAMPLE 3

In Example 3, a glass with a conductive ceramics sintered body that is attached on a dark ceramics sintered body was immersed into sample A5 as the first treatment liquid, and then sequentially immersed into sample B3 as the second treatment liquid.

In the glass with a conductive ceramics sintered body that is attached on a dark ceramics sintered body sequentially immersed into the above described samples A5 and B3, a time until separating the conductive ceramics sintered body from the dark ceramics sintered body and a time until separating the dark ceramics sintered body from the glass were measured respectively. As a result, it was found that the glass with a conductive ceramics sintered body that is attached on a dark ceramics sintered body can be effectively separately collected in such a short time as a time until separating the conductive ceramics sintered body by immersing into the sample A5 of 1 minute and a time until separating the dark ceramics sintered body by immersing into the sample B3 of 8 minutes.

The invention claimed is:

1. A separating method for a conductive ceramics sintered body, comprising an immersion step of immersing a glass with a conductive ceramics sintered body in an aqueous solution for separation, the aqueous solution having etching ability for at least one of the glass and the conductive ceramics sintered body, so as to separate the conductive ceramics sintered body from the glass;
   wherein the conductive ceramics sintered body is attached on a dark ceramics sintered body; and
   wherein the immersion step includes a first immersion step of immersing the glass with the conductive ceramics sintered body attached on the dark ceramics sintered body in an acidic aqueous solution containing hydrochloric acid and separating the glass with the dark ceramics sintered body from the conductive ceramics sintered body, and a second immersion step of immersing the glass attached with the dark ceramics sintered body, which is separated from the conductive ceramics sintered body in the first immersion step, in an acidic aqueous solution containing fluorine ions and separating the glass attached with the dark ceramics sintered body into the dark ceramics sintered body and the glass.

2. The method according to claim 1, wherein a concentration of the hydrochloric acid contained in the acidic aqueous solution is 0.27 mol/L (1.0 wt %) or more.

3. The method according to claim 1, wherein the acidic aqueous solution comprises $HF_2^-$ as the fluorine ions, and a concentration of the $HF_2^-$ is 0.005 mol/L or more.

* * * * *